Jan. 4, 1966    D. A. PAYNTER    3,227,889
D.C. TO A.C. TRANSISTOR CONVERTERS
Filed Dec. 15, 1961    3 Sheets-Sheet 1
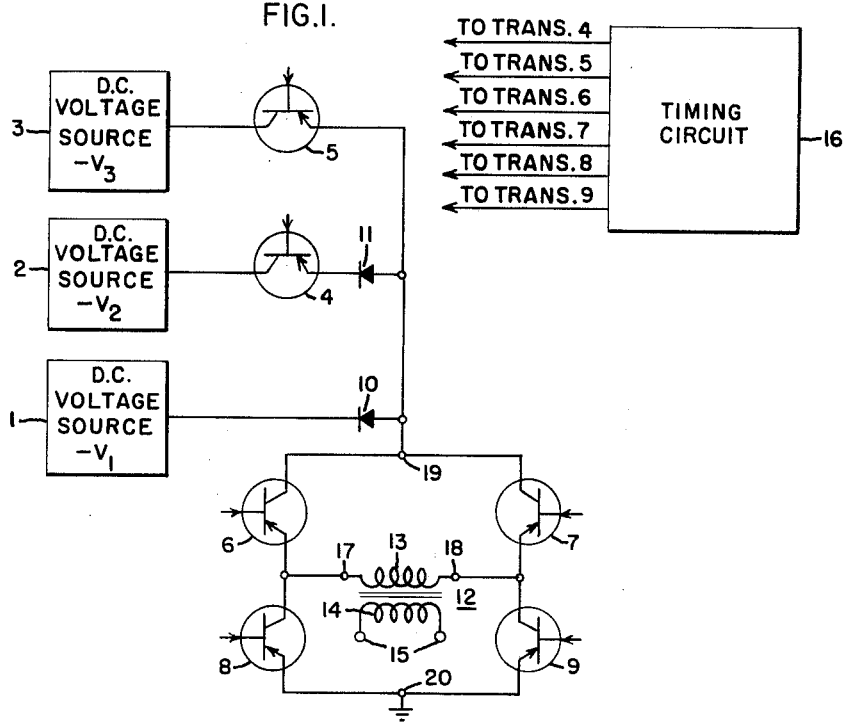
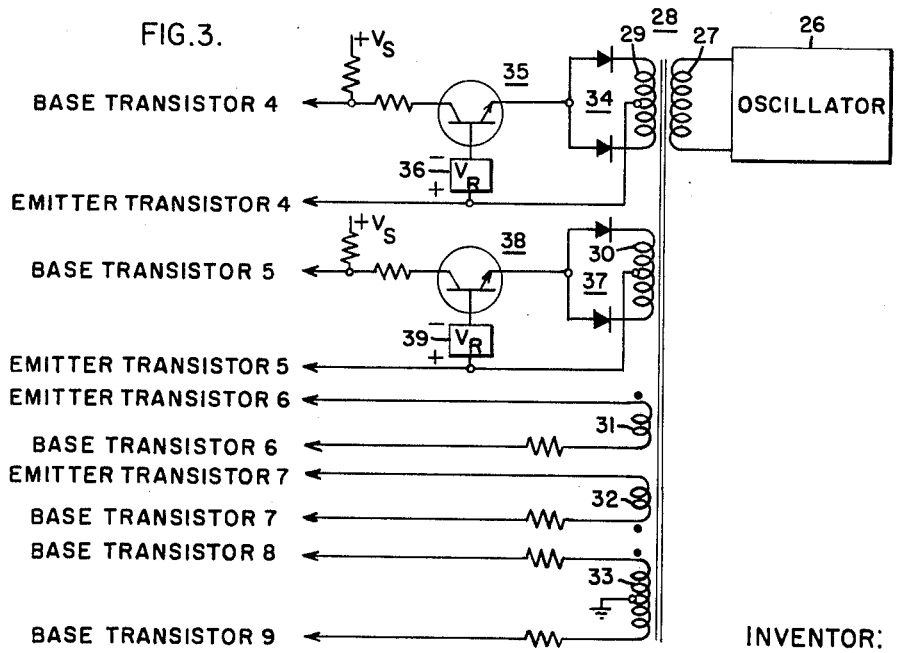
INVENTOR:
DONALD A. PAYNTER,
BY *Marvin A. Goldenberg*
HIS ATTORNEY.

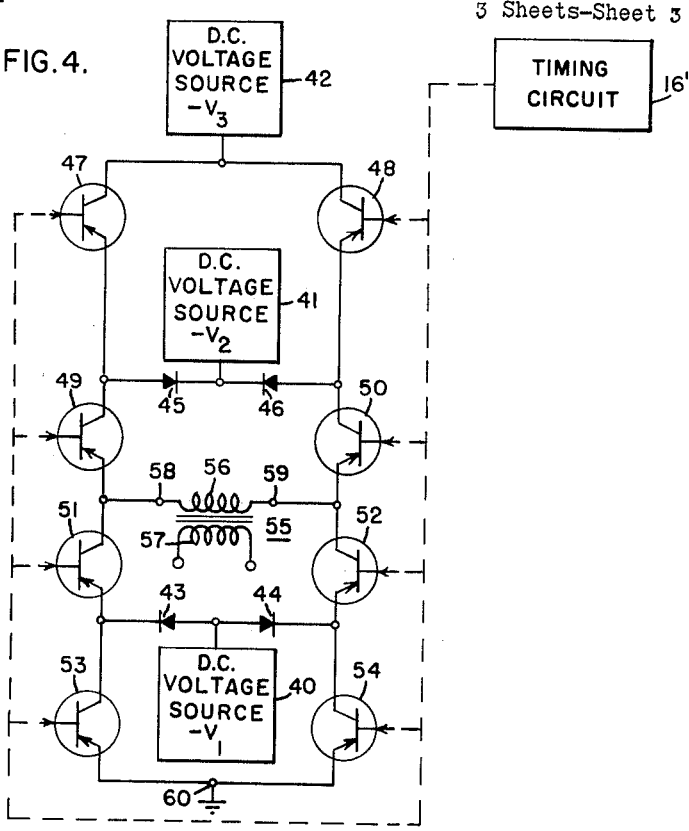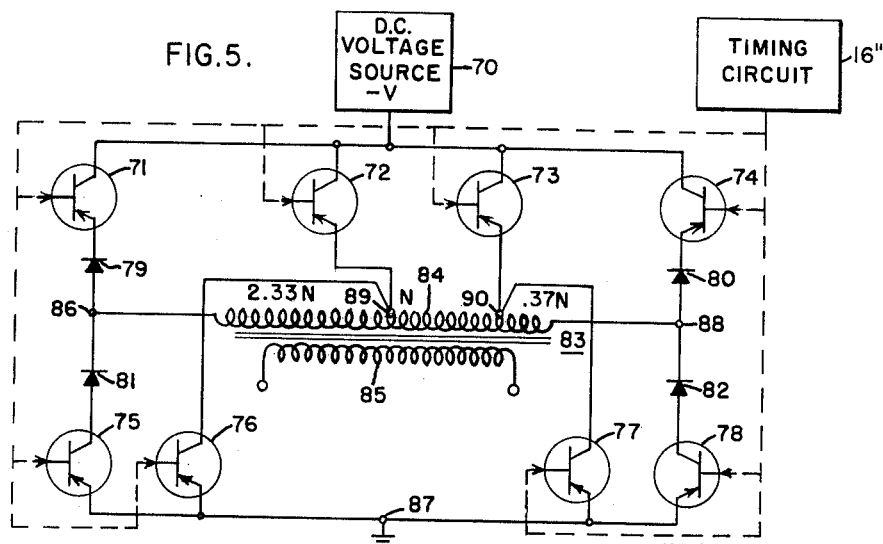

United States Patent Office 3,227,889
Patented Jan. 4, 1966

3,227,889
D.C. TO A.C. TRANSISTOR CONVERTERS
Donald A. Paynter, Syracuse, N.Y., assignor to General Electric Company, a corporation of New York
Filed Dec. 15, 1961, Ser. No. 159,605
11 Claims. (Cl. 307—81)

The present invention relates to novel high efficiency D.C. to A.C. transistor converters and more particularly is directed to D.C. to A.C. transistor converters of a bridge configuration which may be employed as sine wave generators.

D.C. to A.C. transistor converters, per se, are well known in the transistor art. Basically, they comprise a plurality of transistor switches in combination with a D.C. power supply and a transformer. The transistor switches operate to alternately conduct current from the power supply first in one direction and then in the opposite direction through the primary winding of the transformer so as to induce an alternating voltage in the secondary winding. Since little energy is dissipated in the transistors, transistor converters of this type are highly efficient. They are also light-weight, small in size and of low cost. Numerous modifications have been made to the basic transistor converter to provide a variety of flexible and useful outputs. Control windings have been provided to obtain a multivibrator form of operation. In addition, the circuits have been modified so as to provide amplification of externally applied input signals. In this manner the circuits have been useful as regulated D.C. power supplies and low frequency A.C. amplifiers. The present invention contemplates further modifications of the transistor converter wherein the above inherent advantages are attained so that the circuit may perform as a highly efficient step sine wave generator.

Accordingly, it is an object of the present invention to provide a highly efficient sine wave generator having advantageous weight and size characteristics.

It is another object of the present invention to provide a novel D.C. to A.C. transistor converter circuit of high efficiency which obtains a multiple stepped output voltage that can be readily shaped into useful waveforms.

It is still another object of the present invention to provide a novel D.C. to A.C. transistor converter circuit providing a multiple stepped output voltage which circuit may be employed as a highly efficient sine wave generator.

Briefly, these and other objects of the invention are accomplished in one aspect thereof in a circuit employing a plurality of transistor switches and diodes in combination with a plurality of D.C. voltage sources of differing voltage magnitudes and a load such as may include a transformer having a primary and secondary winding. The transistors are operated in either a fully conducting or nonconducting state and are sequentially triggered so as to successively couple different voltage magnitudes from said plural voltage sources to said primary winding to conduct current in a first direction and then in the opposite direction, thereby providing a multiple stepped output voltage in the transformer secondary winding. The stepped waveform of the output voltage is a function of the switching sequence of the transistors and the various voltage levels. The switching transistors and the primary winding form a bridge type configuration wherein the winding is connected so that current is conducted by transistors through the entire winding in first one direction and then in the opposite direction. Thus, to provide a multiple stepped sine wave output a switching sequence of the transistors is established which couples first increasing levels of voltage and then decreasing levels of voltage, with current flowing in a single direction to provide a half cycle approximation to a sine wave, and then repeating the transistor switching sequence but reversing the direction of current to provide the other half cycle of the sine wave approximation.

In accordance with another aspect of the invention a single voltage source is employed in combination with a plurality of transistor switches and a transformer having a tapped primary winding. The transistor switches are sequentially actuated to couple the voltage source to selected portions of the primary winding so as to provide a multiple stepped output voltage in the secondary winding.

While the specification concludes with claims particularly pointing out and distinctly claiming the subject matter which is regarded as the invention, it is believed that the invention will be better understood from the following description taken in connection with the accompanying drawings in which:

FIGURE 1 is a schematic digram of a multiple step bridge transistor converter circuit employing three voltage sources;

FIGURE 3 is a schematic diagram of the timing circuit of FIGURE 1 shown in greater detail;

FIGURE 4 is a schematic diagram of another embodiment of a multiple step bridge transistor converter circuit employing three voltage sources; and FIGURE 5 is a schematic diagram of a multiple step bridge type transistor converter employing a single voltage source.

Figure 2:
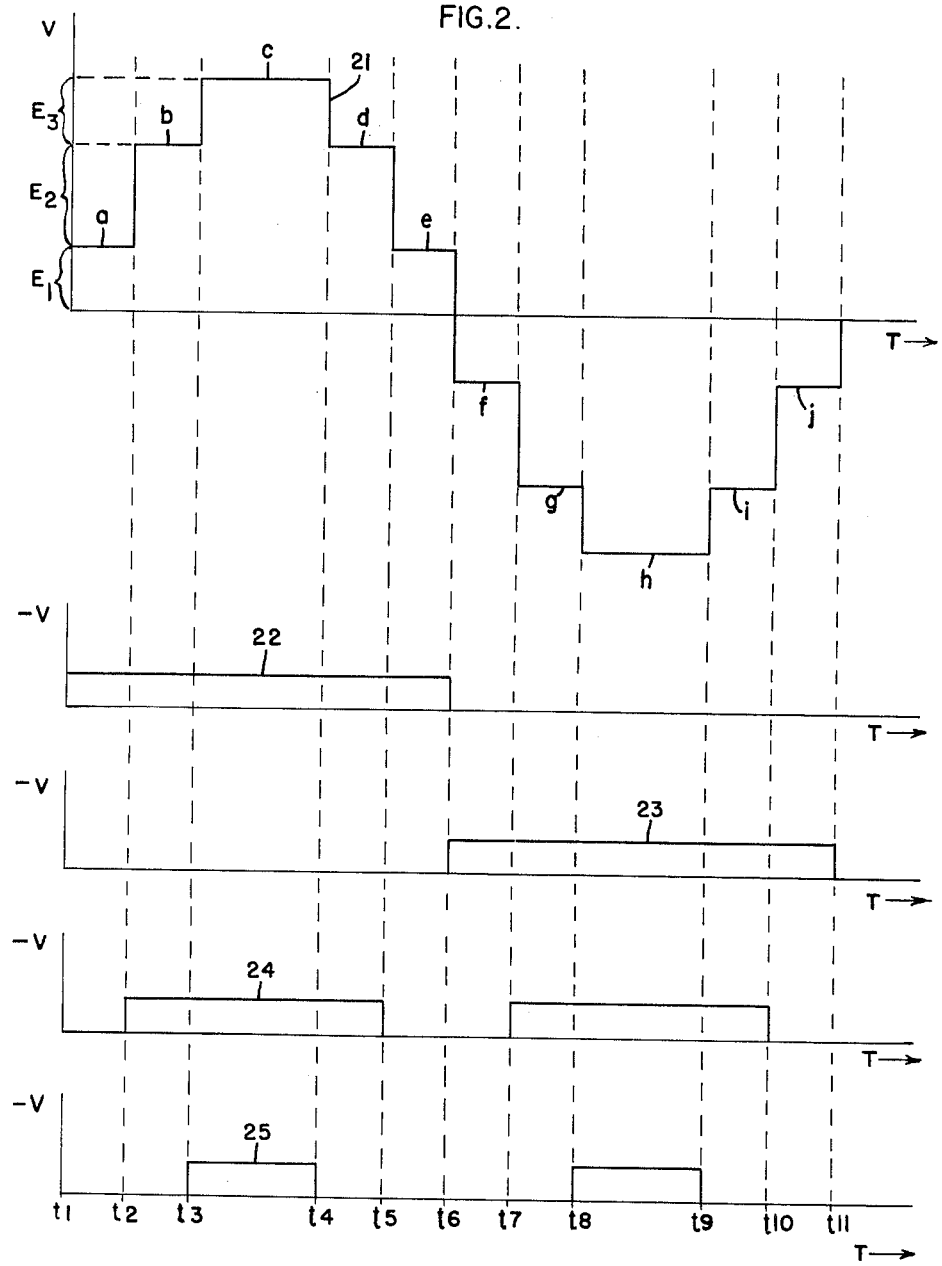
FIGURE 2 is a diagram showing various waveforms applicable to the circuit of FIGURE 1 when operated as a sine wave generator.

Referring now to FIGURE 1, there is illustrated one embodiment of the invention relating to a multiple step bridge transistor converter circuit. A power supply, including three negative D.C. voltage sources 1, 2 and 3 of voltage levels $-V_1$, $-V_2$ and $-V_3$, respectively, of successively increasing magnitudes, is coupled by a plurality of PNP transistors switches 4, 5, 6, 7, 8, 9 and diodes 10, 11 to a load, including transformer 12 having primary winding 13 and secondary winding 14, so as to provide a multiple stepped output voltage across output terminals 15 of secondary winding 14. The output voltage may be subsequently smoothed and shaped into the desired waveform by a smoothing filter, not shown. The transistors, which are operated either in a fully conducting or nonconducting state, are sequentially actuated by external trigger signals which may be applied to the base electrodes from a timing circuit 16 to provide the desired stepped function of the alternating output voltage.

One terminal 17 of primary winding 13 is coupled to the junction of the emitter electrode of transistor 6 and the cellector electrode of transistor 8. The other terminal 18 of winding 13 is coupled to the junction of the emitter electrode of transistor 7 and the collector electrode of transistor 9. The collector electrodes of transistors 6 and 7 are joined at terminal 19, and the emitter electrodes of transistors 8 and 9 are joined at terminal 20, shown grounded to form a bridge configuration. Transistors 6 and 9 conduct together to provide a current path through primary winding 13 in one direction, and transistors 7 and 8 conduct together on the alternate half cycle of the output to provide a current path through winding 13 in the opposite direction. Voltage source 1 is connected through diode 10 to terminal 19, the cathode of diode 10 being connected to source 1 and the anode thereof being connected to terminal 19. Voltage source 2 is connected through transistor 4 and diode 11 to terminal 19, the collector electrode of transistor 4 being connected to source 2, the emitter electrode thereof being connected to the cathode of diode 11 and the anode of diode 11 being connected to terminal 19. Voltage source 3 is connected through transistor 5 to terminal 19, the collector electrode of transistor 5 being connected to source 3 and the emitter electrode thereof being connected to terminal 19. Transistors 4 and 5 are selectively actuated to couple voltage sources 1, 2 or 3 to the bridge circuit.

External trigger signals for actuating the transistors are generated in timing circuit 16, which may take the form of the circuitry illustrated in FIGURE 3. When the circuit is operating as a three stepped sine wave generator the output voltage across terminals 15 is as shown by waveform 21 in FIGURE 2. The trigger signals from timing circuit 16 correspond schematically to waveforms 22, 23, 24 and 25, e.g., waveform 22 being applied to transistors 6 and 9, waveform 23 being applied to transistors 7 and 8, waveform 24 being applied to transistor 4, and waveform 25 being applied to transistor 5.

Consider now the operation of the circuit when performing as a three-stepped sine wave generator. To aid in the explanation, one cycle of the output voltage will be examined with respect to several points in time, indicated in FIGURE 2. At time $t1$ waveform 22 is applied to the base electrodes of transistors 6 and 9 and these transistors become fully conducting. Current is then conducted from terminal 20 to source 1 in a path including transistor 9, primary winding 13, transistor 6 and diode 10. The current induces a voltage in secondary winding 14, shown by level $a$ of the output waveform 21 in FIGURE 2. At time $t2$ waveform 24 is applied to the base electrode of transistor 4 to turn ON transistor 4, and current is conducted from terminal 20 to source 2 through primary winding 13 in the same direction as previously recited. Since $-V_2$ is more highly negative than $-V_1$, diode 10 is now biased in the backward direction which effectively decouples source 1 from the bridge circuit. The application of $-V_2$ to the bridge causes an increased rate of flux change generated by the primary winding and an output voltage is induced in secondary winding 14 shown by level $b$ of the output waveform 21. At time $t3$ waveform 25 is applied to the base electrode of transistor 5, turning ON transistor 5, and current is conducted from terminal 20 to source 3 through primary winding 13 in the same direction as previously recited. Both diodes 10 and 11 are now back biased. An output voltage is induced shown by level $c$ of waveform 21. At time $t4$ waveform 25 is terminated, turning OFF transistor 5 and current is again conducted from terminal 20 to source 2, providing an output voltage shown by level $d$. At time $t5$ waveform 24 is terminated, turning OFF transistor 4 and current is again conducted from terminal 20 to source 1, providing an output voltage shown by level $e$. At time $t6$ waveform 22 is terminated, turning OFF transistors 6 and 9 and waveform 23 is applied to the base electrodes of transistors 7 and 8 and these transistors are turned ON. Current is conducted through winding 13 in the opposite direction and level $f$ of the output voltage is provided. In succeeding points of time the transistors are sequentially triggered in similar manner to that described above to provide the negative half cycle of the output waveform 21, and the process is repeated to provide successive stepped sine wave cycles.

The output voltage from secondary winding 14 may be supplied to a low-pass smoothing filter, not shown, and a sine wave derived at the output thereof. The size of the filter is minimized by optimizing the voltage levels and the duty times of the voltages induced in the secondary winding 14. It should be appreciated that the circuit of FIGURE 1 may be readily modified to provide a multiple step generator of an increased number of steps by coupling additional voltage sources to the bridge circuit. The greater the number of steps the greater the reduction in the harmonic content and the simpler the filtering requirements.

The voltage level and duty time relations for a multiple stepped output voltage of $n$ steps is mathematically derived as follows: If $E_1$ is the amplitude of the first step of the output voltage, $E_2$ the amplitude of the second step, $E_s$ the amplitude of the $s$th step, and $K_1$, $K_2$, $K_s$ are the respective duty times of the voltage steps, then the output waveform for $s$ steps may be expressed by $$E = \frac{4}{\pi}\bigg[(E_1 \sin K_1\pi + E_2 \sin K_2\pi \cdots E_s \sin K_s\pi) \cos \theta +$$

$$\frac{1}{3}(E_1 \sin 3K_1\pi + E_2 \sin 3K_2\pi \cdots E_s \sin 3K_s\pi) \cos 3\theta \cdots +$$

$$\frac{1}{n}(E_1 \sin nK_1\pi + E_2 \sin nK_2\pi \cdots E_s \sin nK_s\pi) \cos n\theta\bigg]$$

(1)

To illustrate the improvement in harmonic content, a conventional square wave, having a single step, may be expressed by the above equation wherein $E_2$ through $E_s$ equal zero and $K_1 = \frac{1}{2}$, so that $$E = \frac{4E_1}{\pi}\left(\cos \theta - \frac{1}{3}\cos 3\theta + \cdots \frac{1}{n}\cos n\theta\right) \quad (2)$$

If a two-step output wave is assumed, then for steps of equal time apportionment, $K_1 = \frac{1}{2}$ and $K_2 = \frac{1}{4}$ and $$E = \frac{4}{\pi}\bigg[\left(E_1 + \frac{E_2}{\sqrt{2}}\right)\cos \theta + \frac{1}{3}\left(-E_1 + \frac{E_2}{2}\right)\cos 3\theta +$$

$$\frac{1}{5}\left(E_1 - \frac{E_2}{\sqrt{2}}\right)\cos 5\theta \cdots \bigg] \quad (3)$$

If $$E_1 = \frac{E^2}{\sqrt{2}}$$

then the third and fifth harmonics are seen to be set to zero yielding an appreciable improvement over the conventional square wave. Accordingly, it may be demonstrated that a three step output wave as illustrated by waveform 21 in FIGURE 2 eliminates harmonics up to the eleventh, where $K_1 = \frac{1}{2}$, $K_2 = \frac{1}{3}$, $K_3 = \frac{1}{6}$ and $E_1 = .58$, $E_2 = E_3$.

Although the circuit of FIGURE 1 is descried as providing an approximated sine wave output, it may be appreciated that the timing sequence and the voltage magnitudes of the power supply can be adjusted as required to provide multiple stepped output voltages assuming a variety of different waveforms in accordance with particular requirements. Further, where minimum filter requirements are desirable, improved sine waveforms can be obtained at the output terminals by applying sinusoidally shaped trigger signals to some or all of the circuit transistors. In addition, the load need not include a transformer, but rather a resistive or reactive load may be connected directly between terminals 17 and 18. The above will also be seen to be true for the circuit of FIGURE 4.

A timing circuit such as illustrated in FIGURE 3 may supply the necessary trigger signals to the transistors of the circuit of FIGURE 1. The timing circuit is seen to include a conventional oscillator 26 operating at the frequency of the output voltage of the circuit of FIGURE 1. Oscillator 26 is coupled to the primary winding 27 of transformer 28 having secondary windings 29, 30, 31, 32 and 33. Windings 29, 30 and 33 are center tapped. Winding 29 is coupled to a full wave rectifier 34, the rectified output of which is connected to the emitter electrode of a comparator transistor 35. A D.C. voltage reference 36 of value $V_R$ is connected between the base electrode and the center tap of winding 29, which is in common with the emitter electrode of transistor 4. During the portion of the half cycle when the magnitude of the negative rectified output exceeds $V_R$, transistor 35 conducts and supplies a trigger signal from its collector electrode to transistor 4. In this instance, as seen by waveform 24 in FIGURE 2, transistor 35 is conducting over two thirds of each half cycle. Similarly, winding 30 is connected to rectifier 37, the output of which is coupled to comparator transistor 38 which compares the negative rectified output with D.C. voltage $V'_R$ of source 39 and supplies a trigger signal to transistor 5. $V'_R$ has a relative magnitude such as to provide conduction of transistor 38 over one third of each half cycle. Windings 31 and 32 have one side connected to the emitter electrodes of transistors 6 and 7, respectively, and the other side connected to the base electrodes of transistors 6 and 7, respectively. Windings 31 and 32 serve to drive transistors 6 and 7 during entire positive or negative half cycles. The dotted terminals indicate that the transistors are driven in phase opposition. Winding 33 has one side connected to the base electrode of transistor 8 and the other side connected to the base electrode of transistor 9. The center tap is connected to the grounded emitters of transistors 8 and 9. Transistors 8 and 9 are driven simultaneously with transistors 7 and 6, respectively.

Referring now to FIGURE 4, there is illustrated a second embodiment of the invention showing a multiple step bridge transistor converter employing plural voltage sources. The transistors of this circuit perform the dual function of providing current reversal in the primary winding of the converter transformer as well as selectively coupling different levels of D.C. voltage into the circuit. The circuit includes first, second and third negative voltage sources 40, 41 and 42 of voltages $-V_1$, $-V_2$ and $-V_3$, respectively, diodes 43, 44, 45 and 46, PNP transistors 48, 49, 50, 51, 52, 53 and 54 and transformer 55 having primary winding 56 and secondary winding 57. Primary winding 56 is connected at one terminal 58 to the junction of the emitter electrode of transistor 49 and the collector electrode of transistor 51, and is connected at the other terminal 59 to the junction of the emitter electrode of transistor 50 and the collector electrode of transistor 52. Transistors 49 and 52 conduct together to provide a current path through primary winding 56 in one direction, and transistors 50 and 51 conduct together on the alternate half cycle to provide a current path through winding 56 in the opposite direction. The emitter electrode of transistor 51 is connected through diode 43 to source 40, the cathode of diode 43 being connected to the emitter of transistor 51 and the anode being connected to source 40. The emitter electrode of transistor 52 is connected through diode 44 to source 40, the cathode of diode 44 being connected to the emitter of transistor 52 and the anode being connected to source 40. The junction of the cathode of diode 43 and the emitter of transistor 51 is connected to the collector electrode of transistor 53, and the junction of the cathode of diode 44 and the emitter of transistor 52 is connected to the collector electrode of transistor 54. The emitter electrodes of transistors 53 and 54 are connected to ground terminal 60. The collector electrode of transistor 49 is connected through diode 45 to source 41, the anode of diode 45 being connected to the collector of transistor 49 and the cathode being connected to source 41. The collector electrode of transistor 50 is connected through diode 46 to source 41, the anode of diode 46 being connected to the collector of transistor 50 and the cathode being connected to source 41. The junction of the anode of diode 45 and the collector of transistor 49 is connected to the emitter electrode of transistor 47, and the junction of the anode of diode 46 and the collector of transistor 50 is connected to the emitter electrode of transistor 48.

The collector electrodes of transistors 47 and 48 are connected in common to voltage source 42.

The circuit operates to provide a multiple level square wave output voltage in similar fashion to the circuit of FIGURE 1. To provide a three stepped sine wave output as shown by waveform 21 in FIGURE 2, the transistor switches 47 to 54 can be triggered by trigger signals which may be generated in a timing circuit 16' of the type illustrated in FIGURE 3. Thus, during the first half cycle of the three stepped output wave, transistors 49 and 52 are first turned ON simultaneously, and current flows from source 40 to more negative source 41 in a direction into terminal 59 and out of terminal 58. Level $a$ of the output voltage is provided. In sucession, transistors 54 and 47 are turned ON, providing levels $b$ and $c$. With transistor 54 conducting, current flows from ground to source 41 in the same direction as previously. Then with transistor 47 conducting, current flows from ground to source 42. Diodes 44 and 45 are back biased when transistors 54 and 47 are conducting, and effectively decouple sources 40 and 41, respectively, from the bridge. Transistors 47 and 54 are then turned OFF, in the order recited, and levels $d$ and $e$ are provided. Next, transistors 49 and 52 are simultaneously turned OFF and transistors 50 and 51 turned ON, providing level $f$. Current now flows from source 40 to source 41 through winding 56 in the opposite direction to that previously recited. Transistors 53 and 48 are successively actuated to provide levels $g$ and $h$, and turned OFF in reverse order to provide levels $i$ and $j$. The sequence is repeated to supply successive cycles of the three stepped output voltage.

It may be appreciated that the circuit of FIGURE 4, by the proper sequenching of the transistors, can provide a four stepped output voltage, the additional step being provided by the voltage difference between sources 42 and 40.

It is noted that the circuit configuration of FIGURE 4, having a plurality of serially connected diodes coupled to either side of the transformer primary, provides the advantage of having the source voltage distributed across a plurality of transistors. This allows the employment of transistors having lower inverse voltage capabilities, or, considered otherwise, makes possible the employment of higher source voltages.

Referring now to FIGURE 5 there is illustrated a multiple step bridge transistor converter employing a single voltage source 70 of voltage $-V$ in combination with a plurality of PNP transistor switches 71, 72, 73, 74, 75, 76, 77, 78, diodes 79, 80, 81, 82 and a transformer 83 having a tapped primary winding 84 and a secondary winding 85. The transistors are sequentially actuated to couple voltage source 70 to either the entire primary winding or tapped portions thereof so as to induce a multiple stepped output voltage in secondary winding 85. One terminal 86 of primary winding 84 is coupled through diode 79 and transistor 71 to source 70, the anode of diode 79 being connected to terminal 86, the cathode being connected to the emitter electrode of transistor 71 and the collector electrode being connected to source 70. Terminal 86 is coupled through diode 81 and transistor 75 to a ground terminal 87, terminal 86 being connected to the cathode of diode 81, the anode being connected to the collector electrode of transistor 75 and the emitter electrode thereof being connected to terminal 87. The other terminal 88 of primary winding 84 is connected through diode 80 and transistor 74 to source 70, and through diode 82 and transistor 78 to ground terminal 87. Terminal 88 is connected to the anode of diode 80, the cathode thereof being connected to the emitter electrode of transistor 74, and the collector electrode thereof being connected to source 70. Terminal 88 is also connected to the cathode of diode 82, the anode thereof being connected to the collector electrode of transistor 78 and the emitter electrode thereof being connected to termial 87. Thus, with transistors 71 and 78 conducting together and transistors 74 and 75 conducting together on the alternate half cycle, first and second paths are established for current flow through primary winding 84 in opposing directions. Primary winding taps 89 and 90 are coupled to voltage source 70 and ground to provide alternative current paths for effectively varying the turns ratio between the primary and secondary windings and thereby step the output voltage. For good harmonic cancellation in a three stepped output voltage of equally apportioned duty times, the primary winding portions 86–89, 89–90, 90–88 are related by the ratio 2.33:N:N:.37N. Tap 89 is connected to the emitter electrode of transistor 72 and to the collector electrode of transistor 76, and tap 90 is connected to the emitter electrode of transistor 73 and to the collector electrode of transistor 77. The collector electrodes of transistors 72 and 73 are connected to source 70, and the emitter electrodes of transistors 76 and 77 are connected to ground terminal 87.

If the circuit of FIGURE 5 is operated to provide a three stepped sine wave output voltage such as in FIGURE 2, trigger signals from timing circuit 16″ of the same type and sequence as described with respect to FIGURE 4 may be employed. Thus, during the first half cycle of the three stepped output wave, transistors 71 and 78 are first turned ON simultaneously, and current flows from ground terminal 87 to source 70 through the entire primary winding in a direction into terminal 88 and out of terminal 86, and level a of the output voltage is provided. Next, transistor 72 is actuated, and current flows in the same direction as previously from ground to source 70, flowing into terminal 88 and out of tap 89. A voltage is induced in the winding portion between tap 89 and terminal 86 which back biases diode 79 and prevents current flow through transistor 71. The increased effective turns ratio provides an increased rate of flux change generated by the primary winding and produces level b of the output voltage. Level c is provided by actuating transistor 77 so that current flows from ground to source 70 through a portion of winding 84, into tap 90 and out of tap 89, a voltage now also being induced between terminal 88 and tap 90 to back bias diode 82 and prevent current flow through transistor 78. Transistors 77 and 72 are then successively turned OFF in the order recited, to provide levels d and e. Next, transistors 71 and 78 are simultaneously turned OFF, and transistors 74 and 75 actuated to provide level f. Current now flows from ground terminal 87 to source 70 through the entire winding 84 in the opposite direction to that previously recited, into terminal 86 and out of terminal 88. Transistors 76 and 73 are successively actuated to provide levels g and h an dturned OFF in reverse order to provide levels i and j. When transistors 76 and 73 are conducting a voltage is induced in winding portions 86–89 and 88–90 to back bias diodes 81 and 80, respectively. The sequence is repeated to provide successive cycles of a three step output voltage.

As with the circuit of FIGURE 4, it may be appreciated that, by the proper sequencing of the transistors a four stepped output voltage can be obtained, the additional step being provided by the actuation of transistor pairs 71, 77 and 73, 75.

Although the invention has been described with respect to a few specific embodiments for purposes of complete and clear disclosure, it is not intended to be so limited, and numerous modifications in addition to those already presented may occur to those skilled in the art which are embodied in the basic principles taught and which the invention is intended to include. Thus, the circuits disclosed may be readily modified, employing the teaching set forth, to provide additional or fewer steps of the output voltage. In addition, diode 11 in FIGURE 1 and the diodes in FIGURE 5 can be omitted if the trigger signals applied to the transistors associated with these diodes cause the transistors to be turned OFF during the portions of the cycle when they are not intended to be conducting. The appended claims are to be construed to include all such modifications that fall within the true scope and spirit of the invention.

What I claim as new and desire to secure by Letters Patent of the United States is:

1. A converter circuit for translating a direct input voltage into a multiple stepped alternating output voltage comprising:
   (a) a D.C. voltage source,
   (b) a load including a transformer having a tapped primary winding and a secondary winding,
   (c) a first current path coupled to said voltage source for conducting current through said primary winding in one direction, said current path including a first controllable unilaterally conducting device, said primary winding and a second controllable unilaterally conducting device serially connected in the order recited,
   (d) a second current path coupled to said voltage source for conducting current through said primary winding in a direction opposite to said one direction, said second current path including a third controllable unilaterally conducting device, said primary winding and a fourth controllable unilaterally conducting device serially connected in the order recited,
   (e) a tap of said primary winding connected through a fifth unilaterally conducting device to one side of said voltage source and connected through a sixth controllable unilaterally conducting device to the other side of said voltage source, and
   (f) means coupled to said unilaterally conducting devices for selectively actuating said unilaterally conducting devices to conduct current from said voltage source through different portions of said primary winding, and sequentially in opposing directions therethrough, so as to alter the effective turns ratio between said primary and secondary windings, thereby providing said multiple stepped alternating output voltage.

2. A converter circuit for translating a direct input voltage into a multiple stepped alternating output voltage comprising:
   (a) a D.C. voltage source,
   (b) a load including a transformer having a tapped primary winding and a secondary winding,
   (c) a first current path coupled to said voltage source for conducting current through said primary winding in one direction, said current path including a first semiconductor switching device, a first diode, said primary winding, a second diode and a second semiconductor switching device serially connected in the order recited,
   (d) a second current path coupled to said voltage source for conducting current through said primary winding in a direction opposite to said one direction, said second current path including a third semiconductor switching device, a third diode, said primary winding, a fourth diode and a fourth semiconductor switching device serially connected in the order recited,
   (e) a tap of said primary winding connected through a fifth semiconductor switching device to one side of said voltage source and through a sixth semiconductor switching device to the other side of said voltage source, and
   (f) means coupled to said smiconductor switching devices for selectively actuating said semiconductor switching devices to conduct current from said voltage source through different portions of said primary winding, and sequentially in opposing directions therethrough, so as to alter the effective turns ratio between said primary and secondary windings, said diodes being sequentially back biased by voltages induced in said primary winding when said fifth and sixth semiconductor switching devices are conducting, whereby said multiple stepped alternating output voltage is provided.

3. A converter circuit for translating a direct input voltage into a multiple stepped alternating output voltage comprising:
(a) a plurality of D.C. voltage sources each having a different voltage magnitude,
(b) a load,
(c) a first current path for conducting current through said load in one direction, said current path including a controllable unilaterally conducting device, said load and a second controllable unilaterally conducting device serially connected in the order recited,
(d) a second current path for conducting current through said load in a direction opposite to said one direction, said second current path including a third controllable unilaterally conducting device, said load and a fourth controllable unilaterally conducting device serially connected in the order recited,
(e) switching means including a plurality of additional unilaterally conducting devices coupling said voltage sources to said first and second current paths, and
(f) means coupled to said switching means and said unilaterally conducting devices for selectively actuating said switching means and said controllable unilaterally conducting devices to sequentially conduct current from selected ones of said voltage sources through said current paths so as to provide said multiple stepped alternating output voltage.

4. A converter circuit as in claim 3 wherein said additional unilaterally conducting devices include at least one diode device coupled to the voltage source of smallest magnitude and at least one transistor switching device coupled to each of the remaining voltage sources, said diode being poled so as to be in a back biased condition when the transistor devices are conducting.

5. A converter circuit for translating a direct input voltage into a multiple stepped alternating output voltage comprising:
(a) a plurality of D.C. voltage sources each having a different voltage magnitude,
(b) a load including a transformer having a primary and secondary winding,
(c) a first current path for conducting current through said primary winding in one direction, said current path including a transistor switching device, said primary winding and a second transistor switching device serially connected in the order recited,
(d) a second current path for conducting current through said primary winding in a direction opposite to said one direction, said second current path including a third transistor switching device, said primary winding and a fourth transistor switching device serially connected in the order recited,
(e) a diode device coupling the voltage source of smallest magnitude to said first and second current paths,
(f) transistor switching means coupling each of the remaining voltage sources to said first and second current paths, said diode being poled so as to be in a back biased condition when said transistor switching means is conducting, and
(g) means coupled to said transistor switching devices and said transistor switching means for selectively actuating said transistor switching devices and said transistor switching means to sequentially conduct current from selected ones of said voltage sources through said current paths, thereby inducing in said secondary winding said multiple stepped alternating output voltage.

6. A converter circuit for translating a direct input voltage into a multiple stepped alternating output voltage comprising:
(a) a plurality of D.C. voltage sources each having a different voltage magnitude,
(b) a load including a transformer having a primary and secondary winding,
(c) a first current path for conducting current through said primary winding in one direction, said current path including a transistor switching device, said primary winding and a second transistor switching device serially connected in the order recited,
(d) a second current path for conducting current through said primary winding in a direction opposite to said one direction, said second current path including a third transistor switching device, said primary winding and a fourth transistor switching device serially connected in the order recited,
(e) first and second semiconductor devices, respectively, coupling one end of said first and second current paths to a first voltage source,
(f) third and fourth semiconductor devices, respectively, coupling said one end of said first and second paths to a common terminal,
(g) fifth and sixth semiconductor devices, respectively, coupling the other end of said first and second current paths to a second voltage source,
(h) seventh and eighth semiconductor devices, respectively, coupling the other end of said first and second current paths to a third voltage source, and
(i) means coupled to said semiconductor devices and said transistor switching devices for selectively actuating said semiconductor devices and said transistor switching devices to sequentially conduct current from said voltage sources through said current paths, thereby providing said multiple stepped alternating output voltage.

7. A transistor converter circuit as in claim 6 wherein said first, second, fifth and sixth semiconductor devices are diodes, and said third, fourth, seventh and eighth semiconductor devices are transistor switches.

8. A converter circuit for translating a direct input voltage into a multiple stepped alternating output voltage comprising:
(a) a D.C. power supply,
(b) a load including a single phase transformer,
(c) a first current path for conducting current through said single phase transformer in one direction, said current path including a first controllable unilaterally conducting device, said single phase transformer and a second controllable unilaterally conducting device serially connected in the order recited,
(d) a second current path for conducting current through said single phase transformer in a direction opposite to said one direction, said second current path including a third controllable unilaterally conducting device, said single phase transformer and a fourth unilaterally conducting device serially connected in the order recited, and
(e) semiconductor switching means coupled in circuit with said power supply and said first and second current paths in a cooperating relationship with said unilaterally conducting devices for selectively switching said power supply to said single phase transformer so as to sequentially generate therein voltages of different magnitudes, thereby providing said multiple stepped alternating output voltage.

9. A converter circuit as in claim 8 wherein said power supply includes a plurality of voltage sources each having a different voltage magnitude and said semiconductor switching means includes a plurality of additional unilaterally conducting devices connected from said voltage sources to said first and second current paths, said additional unilaterally conducting devices being actuated to selectively conduct current from said voltage sources through said current paths.

10. A converter circuit as in claim 9 wherein said additional unilaterally conducting devices include at least one diode device coupled to the voltage source of smallest voltage magnitude and at least one transistor switching device coupled to each of the remaining voltage sources, said diode being poled so as to be in a back biased condition when the transistor devices are conducting.

11. A converter circuit as in claim 8 wherein said load includes a transformer having a tapped primary winding and a secondary winding, and said semiconductor switching means includes a plurality of additional unilaterally conducting devices connected from said power supply to taps of said primary winding, said additional unilaterally conducting devices being actuated to selectively conduct current from said power supply through various portions of said primary winding to alter the effective turns ratio between said primary and secondary windings.

References Cited by the Examiner
UNITED STATES PATENTS

| | | | |
|---|---|---|---|
| 2,836,734 | 5/1958 | Cichanowicz | 307—81 |
| 3,052,833 | 9/1962 | Coolidge | 321—36 X |
| 3,080,534 | 3/1963 | Paynter | 321—2 |

MILTON O. HIRSHFIELD, *Primary Examiner.*

LLOYD McCOLLUM, *Examiner.*